Patented May 20, 1930

1,759,361

UNITED STATES PATENT OFFICE

JAMES G. MILLER, OF LONE PINE, AND ALEXIS C. HOUGHTON, OF BARTLETT, CALIFORNIA

PROCESS OF TREATING NATURAL ALKALINE WATERS OR BRINES TO OBTAIN THEREFROM COMMERCIALLY USEFUL SUBSTANCES

No Drawing. Application filed April 25, 1929. Serial No. 358,151.

The principal object of our invention relates to a method of obtaining and separating from the alkaline waters or brines of Owens Lake in Inyo County, California, a product of sodium carbonate sufficiently separated from the other constituents of the brine so that commercially useful products such as caustic soda, soda ash, sodium sesquicarbonate, or sodium bi-carbonate in a sufficient state of purity to be acceptable to the trade, can be manufactured therefrom. We shall describe the invention, however, more particularly as it relates to the production of sodium carbonate suitable for the manufacture of sodium hydrate commercially known as caustic soda.

A representative brine from Owens Lake, as it exists in the interstices of the main crystal body, and from which it may be obtained in a clear state by pumping, has approximately the following composition:—

| | Per cent |
|---|---|
| $Na_2CO_3$ | 12.40 |
| $NaHCO$ | .50 |
| $Na_2B_2O_4$ | 2.50 |
| $NaCl$ | 11.20 |
| $KCl$ | 3.00 |
| $Na_2SO_4$ | 4.71 |
| $Na_2SiO_3$ | .30 |
| $Na_2HPO_4$ | .33 |
| Organic matter, other salts, and water | 65.06 |
| Total | 100.00 |

Our invention however is not limited to brines of this particular composition, but applies also to the weaker surface brines containing from 6 to 10 per cent sodium carbonate, which may be concentrated by solar or other methods of evaporation until they have reached a state of saturation as regards sodium carbonate, which may be from 14 to 16 per cent sodium carbonate.

The method used commercially up to the present time for recovering sodium carbonate in a purified state from brines of this type is that of carbonation, which consists in passing into the brine carbon dioxide gas which reacts with the sodium carbonate to form sodium bicarbonate or sodium sesquicarbonate, which substances being less soluble than sodium carbonate crystalize out and may be separated by filtration, and after washing be calcined to produce sodium carbonate commercially known as soda ash. Such method, however, requires the production of carbon dioxide gas by the burning in limekilns of limestone with coke, pumping such gas by means of blowers or compressors through the brine contained in carbonating towers, and the calcining of the resulting sodium bicarbonate or sodium sesquicarbonate in furnaces at a relatively high temperature, which procedure involves the use of much equipment or apparatus such as lime kilns, carbonating towers, compressors and calciners, and the purchase of limestone, coke, and fuel oil or other fuel for the calcination.

One of the objects of our invention is to avoid the use of this equipment or apparatus, and the purchase of this material, and by thus simplifying the process to cheapen the cost of the purified sodium carbonate.

Another objection to the carbonation process is that owing to the fact that these brines are more or less saturated with dissolved silica, this being held in solution by the degree of alkalinity of the original brine, when such brine is made more acid by the introduction of carbon dioxide, this silica is precipitated in a gelatinous or colloidal form, rendering the precipitated sodium bicarbonate difficult to wash free from the mother liquor impurities, and contaminating the product with silica. The presence of silica in sodium carbonate intended for the manufacture of caustic soda is objectionable, as the silica reacts with the calcium hydroxide used in causticizing to form colloidal calcium silicate, which hinders the settling, filtering, and washing of the calcium carbonate mud, and when the calcium carbonate mud is reburned to produce active lime, as is necessary if a favorable figure for the consumption of lime is to be obtained, this calcium silicate accumulates in the system to such a point as to necessitate periodically throwing out all the lime from the process and starting with fresh lime, thus increasing the expense.

Also the sodium metaborate in the brine is converted by carbonation into the more insoluble sodium tetraborate, which tends to be precipitated with the bicarbonate and contaminate the same. The presence of sodium borate in the sodium carbonate to be causticized over a certain low limit is objectionable for the manufacture of caustic soda, as it goes through into the finished caustic, thereby lowering the NaOH content and making it difficult to produce high test caustic soda such as required by the market.

Our invention avoids the contamination of the sodium carbonate with silica or sodium borates.

We have found that when a brine of the approximate composition given is cooled or chilled to a point not lower than zero degrees centigrade, the main constituent which separates out is sodium carbonate decahydrate, $Na_2CO_3.10H_2O$, with a small amount of sodium sulphate decahydrate, $Na_2SO_4.10H_2O$, and that the other constituents of the brine, as sodium and potassium chlorides, sodium borates, sodium silicate, sodium phosphate, and organic matter remain dissolved in the mother liquor and may be more or less completely separated from the decahydrate crystals by filtering or centrifuging and washing the crystals with sufficient cold water to completely displace the mother liquor contained therein. It is to be understood, however, that due to seasonal variations in the sodium and potassium chloride content of these brines, that at times it will not be possible to cool as low as zero degrees centigrade without separating out sodium and potassium chloride in the solid phase. We have found five degrees above zero centigrade a good average operating temperature, but do not wish to limit ourselves to this particular temperature on account of the seasonal variation already mentioned.

We have found further that there is a variation in the amount of $NaHCO_3$ in the brine at different times, and that when the alkalinity of the brines is reduced by the separation of the more alkaline sodium carbonate decahydrate on cooling, there results an increase in the concentration of $NaHCO_3$ in the mother liquor, thereby increasing its acid character and tending to precipitate out colloidal silica from the sodium silicate present. In some brines this separation of silica does not take place until after the decahydrate crystals are removed and does not therefore contaminate the product. In other brines the silica is separated out during the refrigeration or cooling period, and cannot be entirely separated from the crystals when they are filtered or centrifuged and washed. We have found that by our process it is easy and inexpensive to prevent the separation of silica and contamination of the sodium carbonate with this impurity by adding to the raw brine before refrigeration a sufficient amount of sodium hydrate or caustic soda to convert the small amount of sodium bicarbonate present to sodium carbonate, according to the equation:—

$$NaHCO_3 + NaOH = Na_2CO_3 + H_2O$$

A slight excess is used so as to keep the brine sufficiently alkaline to prevent the separation of silica in the mother liquor on removal of sodium carbonate. It is obvious, of course, that other caustic alkalies or alkali earths, as calcium hydroxide, will effect the same result, and may be used in place of or in conjunction with caustic soda. In this manner we find that it is possible to hold all the silica permanently in solution during the cooling period and in the separated mother liquor. By this procedure we can obtain a sodium carbonate product practically free from silica.

We also find in these brines that when there is a precipitation of silica when they are acidified with sodium bicarbonate, carbon dioxide, or other acids, that a portion of the organic coloring matter present in the brine is carried down by the colloidal silica and contaminates the precipitated sodium bicarbonate or sodium carbonate product. The presence of this organic coloring matter is particularly objectionable in the sodium carbonate to be used for the manufacture of caustic soda, as such organic coloring matter is completely soluble in the caustic soda solution, and on evaporating the causticized liquor to a strength of 48% NaOH such as is sold to the trade, the color is concentrated and intensified and gives a deep brown caustic liquor that is objected to. By avoiding the precipitation of silica in our process, we find that the carrying down of organic coloring matter into the product is entirely prevented, such coloring matter all going through into the mother liquor. The decahydrate crystals if properly washed free from mother liquor are snow-white, and when dissolved in pure water give a water white perfectly clear solution, which solution on causticizing yields a caustic liquor that when evaporated down to 48% NaOH is practically free from color.

To give a specific example of our invention, 4000 cubic centimeters of the lake brine in which is dissolved from 5 to 20 grams of sodium hydrate, may be placed in a suitable two gallon pail or other vessel, provided with an agitator of such type as will prevent the building up of crystals on the cooling walls of the vessel. The pail and contents are partly immersed in a cooling medium such as sodium chloride or calcium chloride solution, which is kept sufficiently cooled by any of the well known refrigerating methods. When the temperature of the lake brine has fallen to sixteen degrees centigrade, at which point crystallization may start, it is "seeded" with about one gram of sodium carbonate decahydrate $(Na_2CO_3.10H_2O)$ crystals to avoid supercooling or supersaturation with respect to sodium carbonate, for if any considerable degree of supersaturation occurs, the decahydrate crystals may suddenly separate out at such a rate as to be too small for efficient washing and separation of the mother liquor. The cooling is continued to about five degrees centigrade at such a rate that the crystallizing period from sixteen to five degrees occupies about 1½ to 2 hours in order to favor the growth and building up of a relatively coarse crystal that can be easily filtered and washed. When the temperature has reached five degrees centigrade, the cooling is stopped and the decahydrate crystals separated from the mother liquor by filtration, centrifuging, or other suitable means. We prefer to centrifuge, as this permits a rapid and efficient removal of mother liquor before any appreciable re-solution of the crystals occurs by warming up. When the mother liquor has been whizzed free from the crystals, they are washed in the centrifuge with three 200 cubic centimeter portions each of ice water.

We find that from 50 to 65% of the sodium carbonate contained in the brine may be recovered in the decahydrate crystals, the yield depending on the concentration of $Na_2CO_3$ originally present in the brine. We find the following to be a typical analysis of the decahydrate crystals thus produced from brine of the approximate composition already given.

| | Per cent |
|---|---|
| $Na_2CO_3.10H_2O$ | 90.00 |
| $Na_2SO_4.10H_2O$ | 4.22 |
| $Na_2B_2O_4$ | .24 |
| NaCl | .31 |
| $SiO_2$ | .007 |
| $Na_2HPO$ | .014 |
| Moisture (by difference) | 5.209 |
| Total | 100.000 |

The crystals are sufficiently coarse at the described rate of cooling to be returned on a 10 mesh screen.

The sodium sulphate content of the crystals is not objectionable for the manufacture of caustic soda, as this constituent separates out almost completely upon evaporation of the causticized liquor to 48% NaOH and may be removed, and therefore does not contaminate beyond commercial limits the caustic soda made therefrom.

On the plant scale the brine may be cooled to the desired point with any commercial form of refrigerating apparatus, or it may be cooled by abstraction of heat by evaporation of a portion of the water of the brine under high vacuum, or in the winter it may be cooled by natural means in outside ponds.

What we claim is:

1. The process of separating and recovering sodium carbonate in a purified state from complex brines containing the same which consists in chilling the brine to a temperature above zero degrees centigrade so as to cause the precipitation of sodium carbonate decahydrate, and separating the decahydrate crystals from the brine.

2. The process of separating and recovering sodium carbonate in a purified state from the brines of Owens Lake which consists in chilling the brine to a temperature above zero degrees centigrade so as to cause the precipitation of sodium carbonate decahydrate, and separating the decahydrate crystals from the brine.

3. The process of separating and recovering sodium carbonate in a purified state and free from silica and organic coloring matter from complex brines containing these constituents which consists in treating such brines with caustic alkali and chilling same to a temperature above zero degrees centigrade so as to cause the precipitation of sodium carbonate decahydrate, and separating the decahydrate crystals from the brine.

4. The process of separating and recovering sodium carbonate in a purified state and free from silica from the brines of Owens Lake which consists in treating such brines with caustic alkali and chilling same to a temperature above zero degrees centigrade so as to cause the precipitation of sodium carbonate decahydrate and separating the decahydrate crystals from the brine.

5. The process of separating and recovering sodium carbonate in a purified state and free from organic coloring matter from the brines of Owens Lake which consists in treating such brines with caustic alkali and chilling same to a temperature above zero degrees centigrade so as to cause the precipitation of sodium carbonate decahydrate, and separating the decahydrate crystals from the brine.

6. The process of separating and recovering sodium carbonate in a purified state from complex brines containing the same and dissolved silica which consists in adding to the brine a caustic alkali to maintain the brine sufficiently alkaline to prevent the separation of silica, then chilling the brine to cause the precipitation of sodium carbonate decahydrate, and then separating the decahydrate crystals from the brine.

7. The process of separating and recovering sodium carbonate in a purified state from complex brines containing the same and dissolved silica which consists in treating the brine with a caustic alkali to maintain it sufficiently alkaline to prevent the separation of silica therefrom, chilling the brine to a temperature sufficiently low to cause the precipitation of sodium carbonate decahydrate and then separating the decahydrate crystals from the brine.

8. The process of separating and recovering sodium carbonate in a purified state from complex brines containing the same which consists in chilling the brine to a point at which crystallization of sodium carbonate decahydrate should start, then treating said brine with seed crystals of sodium carbonate decahydrate to avoid supercooling or supersaturation, with respect to sodium carbonate, then continuing the cooling at a slower rate to favor the growth of relatively coarse crystals capable of being filtered and washed and finally separating the decahydrate crystals from the brine.

9. The process of separating and recovering sodium carbonate in a purified state from complex brines containing the same and dissolved silica which consists in treating the brine with a caustic alkali to maintain it sufficiently alkaline to prevent the separation of silica therefrom, chilling the brine to a point at which crystallization of sodium carbonate should start, then treating said brine with seed crystals of sodium carbonate decahydrate to avoid supercooling or supersaturation with respect to sodium carbonate, then continuing the cooling at a retarded rate to permit the growth of relatively coarse sodium carbonate decahydrate crystals capable of being filtered and washed and finally separating the decahydrate crystals from the brine.

10. The process of separating and recovering sodium carbonate in a purified state from complex brines containing the same which consists in chilling the brine to approximately sixteen degrees centigrade, then treating said brine with seed crystals of sodium carbonate decahydrate to avoid supercooling or supersaturation with respect to sodium carbonate, then continuing the cooling at a slower rate to permit the growth of relatively coarse crystals capable of being filtered and washed and finally separating the decahydrate crystals from the brine.

11. The process of separating and recovering sodium carbonate in a purified state from complex brines containing the same which consists in chilling the brine to approximately sixteen degrees centigrade, then treating said brine with seed crystals of sodium carbonate decahydrate to avoid supercooling or supersaturation with respect to sodium carbonate, then continuing the cooling at a slower rate to a temperature of approximately five degrees centigrade to permit the growth of relatively coarse crystals capable of being filtered and washed and finally separating the decahydrate crystals from the brine.

12. The process of separating and recovering sodium carbonate in a purified state from complex brines containing the same and dissolved silica which consists in adding to the brine a caustic alkali to maintain the brine sufficiently alkaline to prevent the separation of silica, then chilling the brine to a temperature of approximately five degrees centigrade to cause the precipitation of sodium carbonate decahydrate, and then separating the decahydrate crystals from the brine.

13. The process of separating and recovering sodium carbonate in a purified state from complex brines containing the same and dissolved silica which consists in treating the brine with a caustic alkali to maintain it sufficiently alkaline to prevent the separation of silica therefrom, chilling the brine to a temperature of approximately five degrees centigrade to cause the precipitation of sodium carbonate decahydrate and then separating the decahydrate crystals from the brine.

14. The process of separating and recovering sodium carbonate in a purified state from complex brines containing the same which consists in chilling the brine to a temperature of approximately five degrees centigrade so as to cause the precipitation of sodium carbonate decahydrate, and separating the decahydrate crystals from the brine.

15. The process of separating and recovering sodium carbonate in a purified state from the brines of Owens Lake which consists in chilling the brine to a temperature of approximately five degrees centigrade so as to cause the precipitation of sodium carbonate decahydrate, and separating the decahydrate crystals from the brine.

In witness whereof, we have hereunto set our hands this 18th day of April, 1929.

JAMES G. MILLER.
ALEXIS C. HOUGHTON.